METHOD AND APPARATUS FOR SEGMENTING SPEECH INTO PHONEMES

Filed Aug. 12, 1963 4 Sheets-Sheet 1

INVENTOR.
DONALD W. TUFTS
BY [signature]
ATTORNEY

INVENTOR.
DONALD W. TUFTS
BY Louis Etlinger
ATTORNEY

METHOD AND APPARATUS FOR SEGMENTING SPEECH INTO PHONEMES

Filed Aug. 12, 1963

INVENTOR.
DONALD W. TUFTS

BY [signature]

ATTORNEY

METHOD AND APPARATUS FOR SEGMENTING SPEECH INTO PHONEMES

Filed Aug. 12, 1963 4 Sheets-Sheet 4

INVENTOR.
DONALD W. TUFTS
BY [signature]
ATTORNEY

United States Patent Office 3,344,233

Patented Sept. 26, 1967

3,344,233

METHOD AND APPARATUS FOR SEGMENTING SPEECH INTO PHONEMES

Donald W. Tufts, Wellesley, Mass., assignor to Sanders Associates, Inc., Nashua, N.H., a corporation of Delaware Filed Aug. 12, 1963, Ser. No. 301,310
13 Claims. (Cl. 179—1)

ABSTRACT OF THE DISCLOSURE

Apparatus is herein disclosed for automatically determining the boundaries between phonemes in continuing speech. The apparatus comprises means for ascertaining sudden shifts of energy contents within various frequency bands, including filters for separating speech into predetermined frequency bands, apparatus for determining the energy within each of the predetermined bands during a specified time period (the period being no greater than that of the shortest phoneme), and apparatus for measuring the relative energy strength in the bands. The disclosure also includes phoneme recognition apparatus which compares the separated phonemes with stored patterns. The disclosure further includes apparatus for using the above-mentioned equipment for speech restatement purposes.

Figure 1:
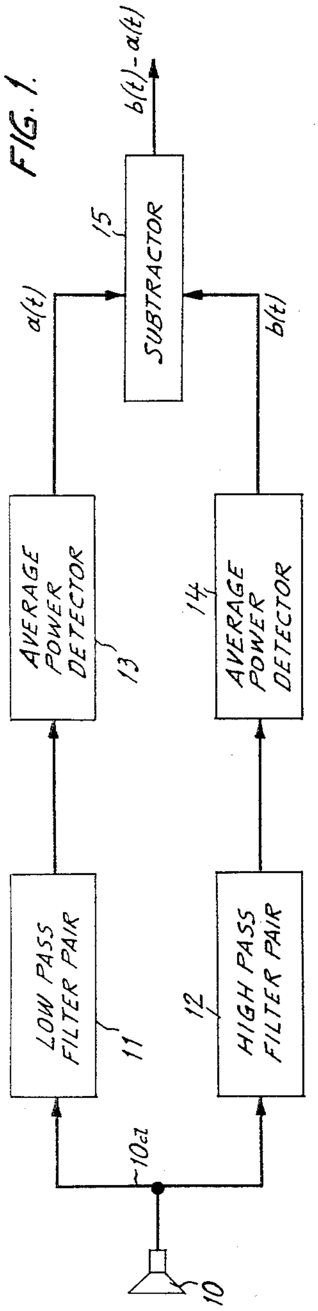

This invention relates to real time methods and apparatus for automatically determining the boundaries between phonemes in continuing speech and for detecting and indicating the various phonemes as they occur, thereby providing for coding speech in a form readily usable in automatic speech processing, speech synthesis, language recognition, translation, speech compression, and in vocal instructions to typewriters, typesetters, computers, and other applications.

The invention is capable of use with any spoken language for which the phonemes are known or can be determined. Phonemes, as is well known, are the smallest basic, distinctive sound units in any language, and are defined as the basic speech sounds, one or more of which constitute a syllable. Examples of English phonemes are the "o" in "go," and the "t" in "out." Certain phonemes are unique to a particular language. For instance, certain phonemes occur only in German, others only in French, etc. The recognition of such unique phonemes enable the identification of the language being spoken.

Phonemes normally range in time length from 10 to 100 milliseconds, and it has been found that a speaker normally cannot produce more than 10 phonemes/second. The number of phonemes in English is only 39, whereas the syllables made up from them are over 1,000.

Essentially identical phoneme patterns appear in the analysis of a given spoken word, regardless of the age, sex, and characteristics of the speaker, and regardless of the influence of dialects and additional language spoken by the speaker. Phoneme patterns appear essentially identical in the analysis of a given word, whether it be spoken with a Boston accent, a southern drawl, or a mid-western nasal twang.

This invention is based on the principle that the short-time distribution of energy over the audio spectrum is what conveys the intelligence of speech. This short-time energy distribution of speech over the audio spectrum can be plotted and is known as a sonogram. We characterize a phoneme by the spectral distribution of energy of an utterance over a time interval during which that distribution is relatively constant or stable.

If speech is broken down into narrow frequency bands, a sonogram will show energy distribution patterns with respect to frequency which remain relatively constant for periods ranging from 10 to 100 milliseconds, separated by small transition periods. These transition periods are the phoneme boundaries and are characterized by sudden shifts of energy content among the various bands. The patterns themselves are individual phonemes, and each one will show a distinct special energy-frequency distribution of its own, and different from that of any other.

If the individual phoneme boundaries can be determined, the individual phonemes can be separated from each other and individually analyzed for the energy-frequency distribution patterns, without regard for the phonemes preceding or following. My invention indicates phoneme boundaries in real time, thus enabling me to separate phonemes as speech is progressing, and to break down a stream of speech signals into small segments which are easily analyzed and processed.

The advantages of speech processing systems based on phonemes, as compared to those based on syllables, words, or digital or analogue coding of multiple bandwidth filter outputs, are, first, the small number of different items which a phoneme-based system must process (39 phonemes compared to over 1000 syllables in English), and that any phoneme can be digitally coded in a very few bits. For example, the 39 English phonemes can be coded in binary code using no more than 6 bits ($2^6$). Since a speaker normally can produce no more than 10 phonemes/second, he produces no more than 60 binary bits of information/second. The advantages in simplicity accruing to my speech processing system based on phonemes are apparent.

As stated, the speech segmentor described herein operates in real time; i.e., it accepts an electrical speech waveform as its input, and provides as its output a series of direct current pulses, the locations of which reliably mark the boundaries of the phonemes in the input speech. The beginning and end of each pulse coincide with the beginning and end of a phoneme, and the duration of each pulse is identical with the phoneme, the boundaries of which it is establishing. This is automatic and independent of the rate of speaking. The speaker need not pronounce individual sounds separately, but may speak in a normal manner.

Generally, according to this invention, the input speech signal is divided into components by means of bandpass filters. In its simplest form, the speech signals are divided into two components, i.e., frequencies above 1200 c.p.s. and frequencies below 1200 c.p.s., but more filters may be used, the complexity of the equipment used increasing with the number of components into which the input speech signals are divided.

Each band of speech energy is detected and averaged, i.e., integrated in an average power detector for about 5 milliseconds at a time. The output of each filter is a direct current of amplitude proportional to the energy contained within the frequencies passed by the filter over a 5 millisecond time period.

The detected output of the low frequency filter is subtracted from the detected output of the high-frequency filter. If the high-frequency band contains relatively more energy than the low-frequency band, the subtractor output will be a DC voltage of an amplitude above a given reference level, and will persist at that level as long as conditions remain unchanged, i.e., for the same phoneme. If the reverse is true, the output of the subtractor will be a DC voltage of an amplitude below a reference level, and again will persist at the same amplitude until conditions change. If there is no energy output from either filter, the subtractor output will be a DC voltage of an amplitude at the reference level, which can be zero volts or any other voltage convenient for the operation of the equipment. While certain modifications of the invention involve more complex apparatus, the basic principles remain the same.

The features of novelty which I believe to be characteristic of my invention are set forth with particularly in the appended claims. My invention itself, however, both as to its fundamental principles and as to its particular embodiments, will best be understood by reference to the specification and accompanying drawing, in which FIG. 1 is a basic block diagram of the simplest form of segmentor according to my invention, FIG. 2 is a similar diagram of a more sophisticated segmentor, embodying additional equipment, FIG. 2*a* is an oscillographic trace of the word "TOOK" as spoken, FIG. 2*b* is an oscillographic trace of the DC pulses derived by apparatus according to my invention from the spoken word "TOOK," the pulses coinciding in time and duration with the phonemes "T," "OO," and "K,"

Figure 6:
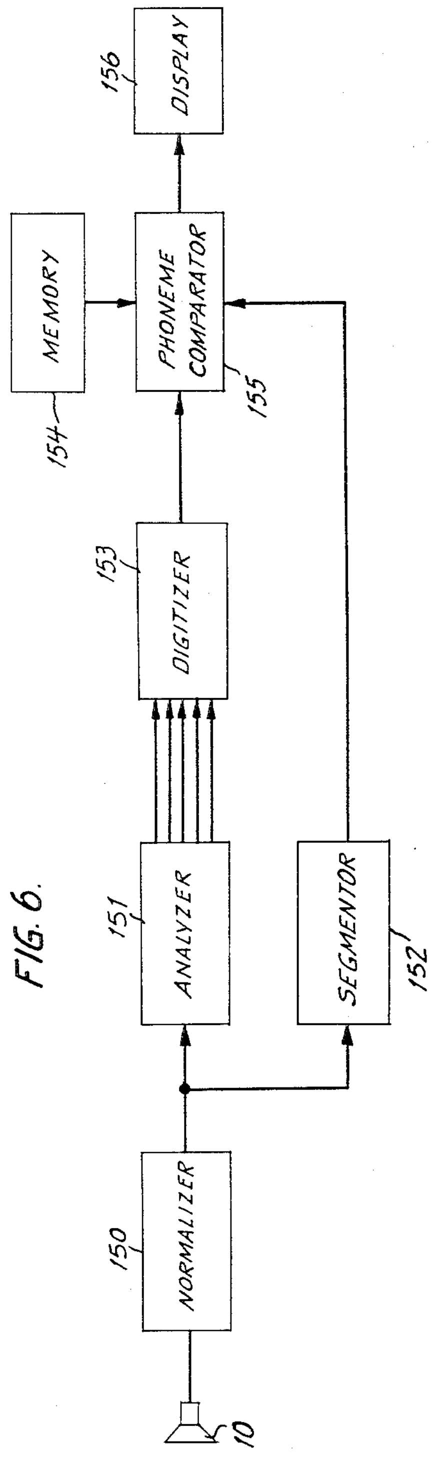
Figure 7:
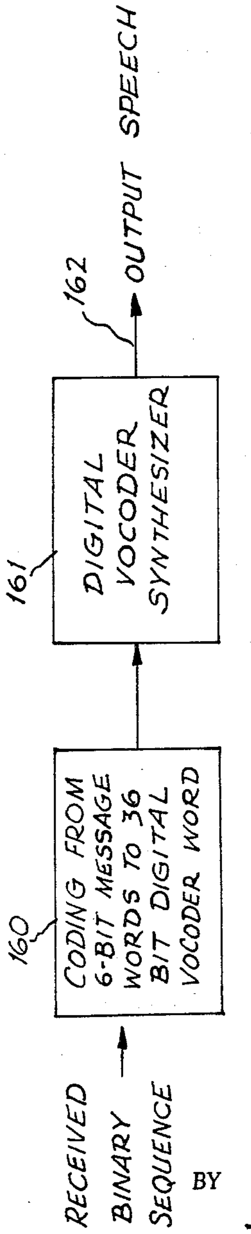
Figure 3:
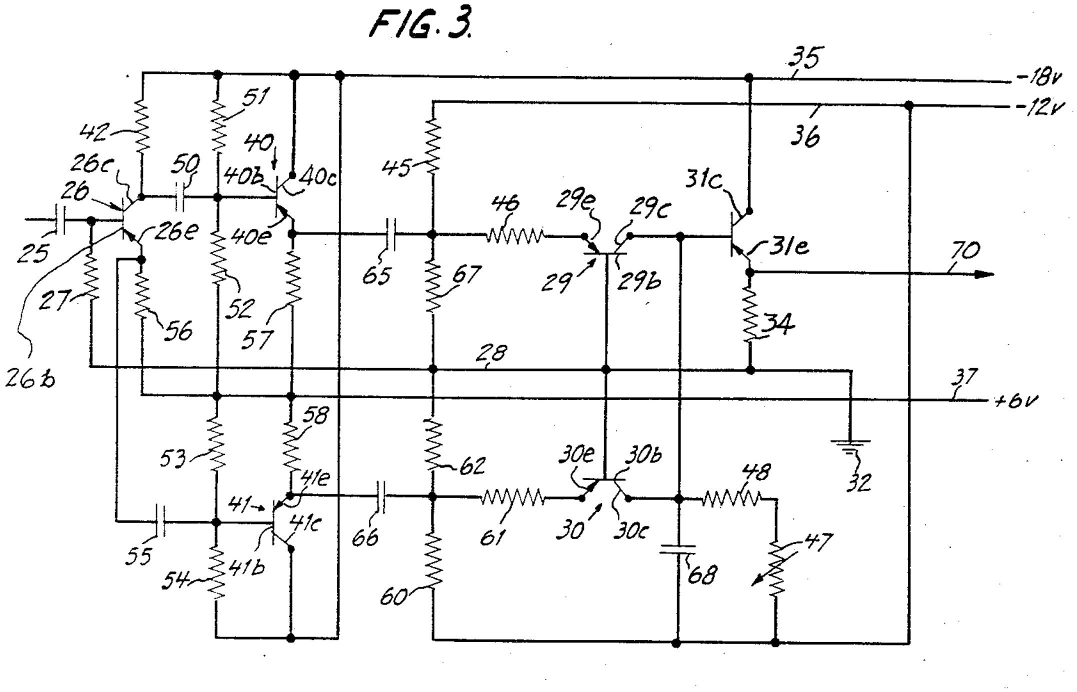
Figure 4:
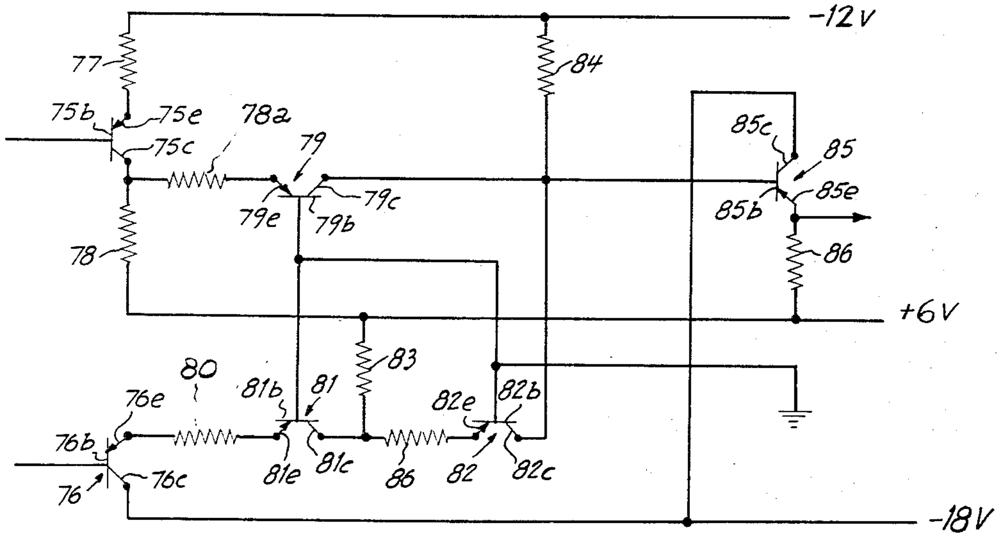
Figure 5:
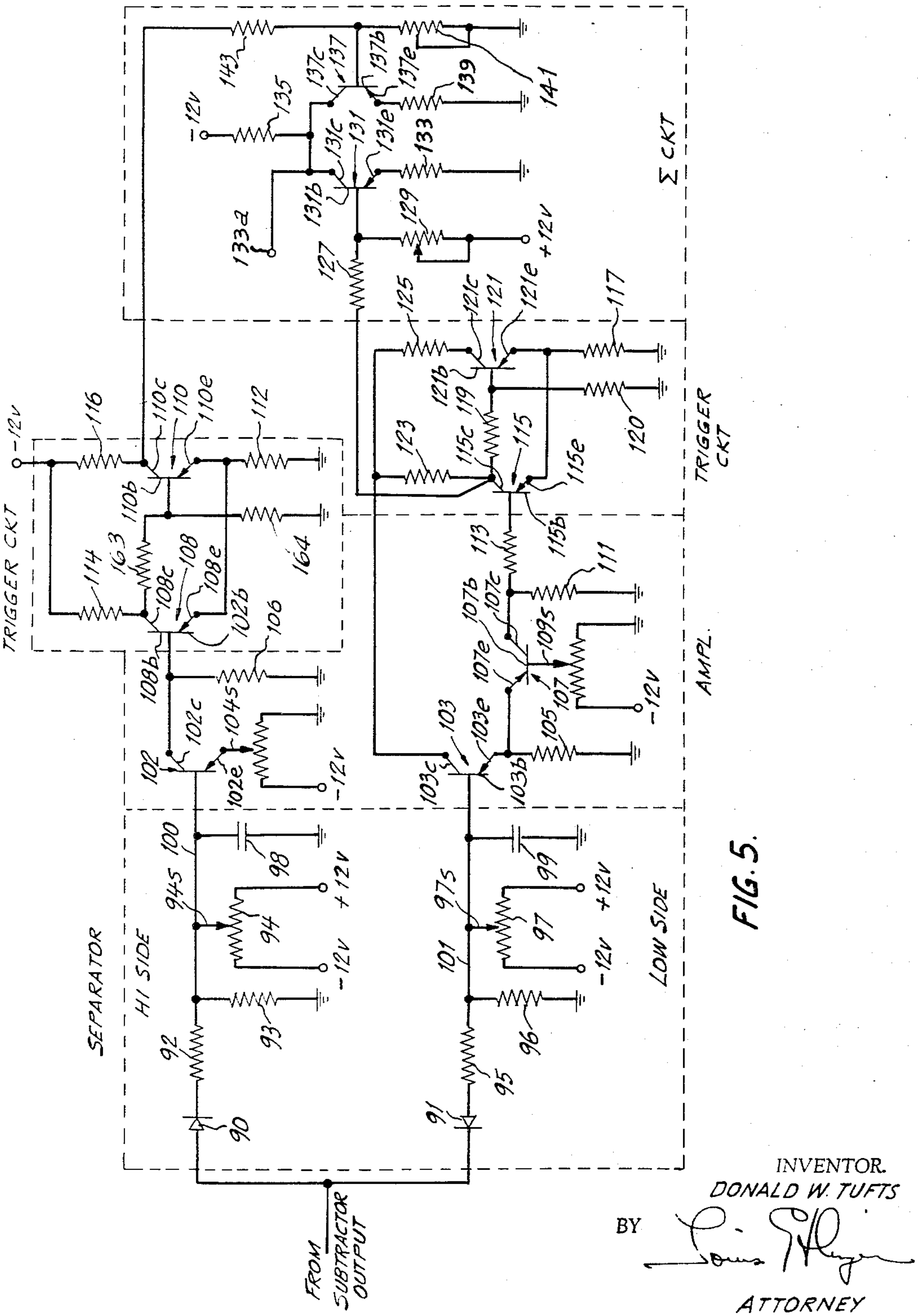

FIG. 3 is a circuit diagram of the average power detector, one of which detects the output of each filter, FIG. 4 is a circuit diagram of the subtractor circuit, FIG. 5 is a circuit diagram of a modification embodying the subtractor, an amplifier, trigger, and summing stages, FIG. 6 is a block diagram of a minimum phoneme recognition demonstrator, potentially useful for speech compression or language recognition, and FIG. 7 is a block diagram of speech restatement equipment according to my invention.

Figure 2:
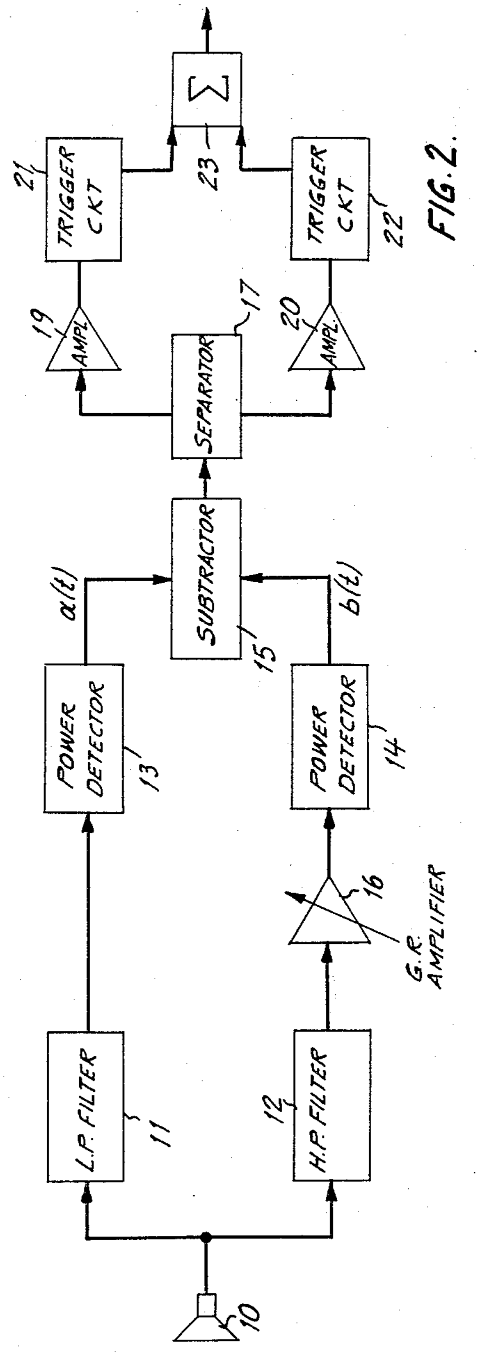
Figure 2A:
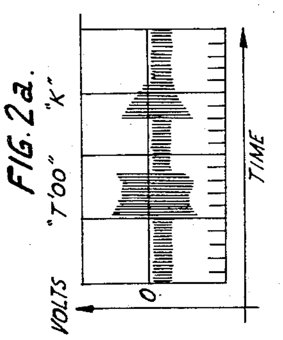
Figure 2B:
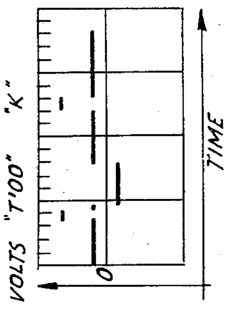

Referring now more particularly to FIG. 1, 10 designates the source of speech signals, diagrammatically shown as a microphone including, if desired, one or more amplifiers, but which may be any other source of speech signals, such as the output of a phonograph, tape recorder, dictating machine, or the like, which supplies electric waves corresponding to speech to conductor **10*a*, which in turn is connected to the input of low pass filter pair 11 and high pass filter pair 12**.

The filters may be any of a number of kinds well known in the art, such as resonant circuits using T or $\pi$ sections or the like, and since such filters are per se no part of this invention, it is not considered necessary to describe them further, except to say that low pass filter 11 passes frequencies below 1200 c.p.s., while high pass filter 12 passes frequencies above 1200 c.p.s.

The output of low pass filter 11, consisting of frequencies below 1200 c.p.s. is supplied to average power detector 13, while that of high pass filter 12 is fed to average power detector 14. Both the high and low frequency channels are similar, differing only in the filter characteristics. The output of average power detector 13 (low side) is designated $a(t)$; that of average power detector 14 (high side) as $b(t)$. Both outputs are fed to subtractor 15, which subtracts $a(t)$ from $b(t)$; i.e., the low from the high.

The outputs of the filters are rectified and averaged (i.e., integrated) for about 5 milliseconds to obtain a measure of the energy in the filtered frequency band over the 5 millisecond interval. At any fixed time $t=t_0$, $a(t_0)$ and $b(t_0)$ the energy is measured in the two non-overlapping speech bands; therefore the subtractor output $$[b(t_0)-a(t_0)]$$

is a measure of the relative energy strength in the two bands. The boundaries between phonemes can be recognized by the sudden characteristic shifts in the relative energy contents of these bands. The subtractor is thus a means for the definite statement of a variation in integrated power between the amounts passing through the two filters.

Referring now to FIG. 2, in which the same reference characters indicate the same elements as in FIG. 1, 10 is the source of speech signals fed to low pass filter 11 and high pass filter 12. In this instance amplifier 16 is interposed between high pass filter 12 and power detector 14, to permit adjusting the amplitude level of the input to power detector 14. Amplifier 16 is provided to compensate for the greater power content in the lower pitch frequencies, and has a gain of 15–20 db. The outputs of both power detectors 13 and 14 are fed to subtractor 15 and the low frequency output $a(t)$ subtracted from the high frequency output $b(t)$.

The output of subtractor 15 is fed to separator 17, which channels the positive pulses (with respect to the reference level, here zero) to trigger generator or circuit 21, and the negative pulses (with respect to the zero reference level) to the trigger generator or circuit 22, each set of pulses being amplified by amplifiers 19 and 20 before being supplied to the respective trigger generators. The trigger pulses generated by each trigger circuit (one representing the high frequency output and the other the low frequency output) are supplied to the summing circuit 23, which is a load resistor network with values so chosen as to provide proper impedance matching and to minimize interaction between the outputs of the trigger generators. The outputs of the summing stage, which are positive and negative pulses shown in FIG. 2*b*, indicate the high and low frequency outputs of the subtractor 15.

Referring now to FIGS. 2*a* and 2*b*, FIG. 2*a* is the trace of the word "TOOK," as spoken. In this figure and also in FIG. 2*b*, the abscissa is time and the ordinate is volts, as indicated. FIG. 2*b* is the segmentor output, in which the horizontal center line is the reference line (here slightly above zero), the upper and lower horizontal lines represent the phonemes "T," "OO," and "K." It will be noted that the "T" and "K" phonemes are of relatively short duration, while the "OO" is longer. It will also be observed that there is a cross-over of the reference line between "T" and "OO," and between "OO" and "K."

"Hash," which appears at the output of the power detector, but which appears to have no particular connection with phoneme duration, may cause spurious indications of segmentation. This hash may occur on either the high or low side of the subtractor. Hence, a means for following the overall pattern, rather than the individual "hash" excursions, is desirable. Peak detectors, arranged to pass current in the direction of the voltage deviation and followed by an integration circuit, take care of this difficulty. The integration period is different for the high and low pass channels.

The pulse output of the summing circuit 23 sharply displays the zero crossing of the subtractor, and the duration of each output pulse indicates the time duration and location of each phoneme in the speech being analyzed.

Referring now to FIG. 3, this is a circuit diagram of the power detectors 13 and 14, which are duplicates of each other, except that it may be desired to use different time constants in the high and low pass channels; i.e., about 10 milliseconds in the low pass section, and about 5 milliseconds in the high pass section. In the description of this figure, values are given by way of example, but not in limitation, and it will be understood that these values may be varied as conditions may make desirable. The output of the band pass filter is supplied to the input of the detector through 0.5 mf. condenser 25, to the base **26*b* of transistor 26**.

Transistor 26 and its associated components act as a phase splitter which provides an output taken from collector **26*c* across resistor 42 which, in turn, is fed to the base of transistor 40 connected in the grounded collector configuration through the coupling capacitor 50. The second output for transistor 26 is taken from the emitter 26*e* across the emitter resistor 56 and is fed to base 41*b* of transistor 41 similarly connected in the grounded collector configuration through coupling capacitor 55. The outputs of transistors 40 and 41 are amplified by the transistors 29 and 30 respectively. The two outputs from transistors 29 and 30 are combined across the integrator circuit made up of capacitor 68 and the fixed resistor 48 and the variable resistor 47. As previously mentioned one of the integrator circuits is designed to have a delay of 5 milliseconds whereas the second one is designed to have a delay of 10 milliseconds. The output appearing across the integrator circuit is applied to the base of transistor 31 which is also arranged in the grounded collector configuration. The output of transistor 31 is then taken across the emitter resistor 34 and appears on line 70. Voltage is supplied to the various transistors through conductor 35, connected to −18 v. of the source of supply, conductor 36 connected to −12 v. of the source, and conductor 37** connected to +6 v. of the source.

Line 35 supplies −18 v. through 2K resistor 42 to collector **26*c* of transistor 26, to collector 40*c* of transistor 40, to collector 41*c* of transistor 41, and to collector 31*c* of transistor 31. Line 36 (−12 v.) leads through 30K resistor 45 and varistor 46 to emitter 29*e* of transistor 29, and through variable 25K resistor 47, set to about 20K, and 5.1K resistor 48 to the collector 30*c* of transistor 30. Collector 26*c* of transistor 26 is connected through 2 mf. condenser 50 to the common point of 16K resistors 51 and 52 connected in series between conductors 35 and 37 (−18 v. and +6 v.). This common point is connected to base 40*b* of transistor 40. 15K resistors 53 and 54 are connected in series between line 37 (+6 v.) and conductor 35 (−18 v.) and the common point of said resistors is connected to base 41*b* of transistor 41, and through 2 mf. condenser 55 to emitter 26*e* of transistor 26. Emitter 26*e* is connected through 2K resistors 56 to +6 v. line 37**.

Line 37 (+6 v.) is connected through 1K resistors 57 and 58 to emitters **40*e* and 41*e* of transistors 40 and 41 respectively. The lower end of resistor 45 is connected through 470 ohms resistor 67 to ground bus 28, and a branch of −12 v. line 36 is connected through 30K resistor 60 and varistor 61 to emitter 30*e* of transistor 30, and the common point of resistor 60 and varistor 61 is connected through 470 ohms resistor 62 to ground bus 28. Emitters 40*e* and 41*e* of transistors 40 and 41 are connected through 50 mf. condensers 65 and 66 to the common point of resistors 45 and 67, and 60 and 62, respectively. The bases 29*b* and 30*b* of transistors 29 and 30 are connected to ground bus 28, collectors 29*c* and 30*c* of transistors 29 and 30 are connected together, and through 0.22 mf. condenser 68 to the −12 v. line 36. The output of the power detector is taken off from emitter 31*e* by output line 70**. Again, by example and not in limitation, the transistors employed are known as 2N404, and the varistors VECO 023W1.

Referring now to FIG. 4, I have shown one form of subtractor which may be employed in my invention. The output from one power detector is connected to the base **75*b* of transistor 75, and that from the other to base 76*b* of transistor 76. Emitter 75*e* is connected through 2K resistor 77 to the −12 v. power source, collector 75*c* is connected through 1K resistor 78 to the +6 v. voltage point on the power source, and through 10K resistor 78*a* to the emitter 79*e* of transistor 79. Emitter 76*e* of transistor 76 is connected through 2K resistor 80 to the emitter 81*e* of transistor 81. The bases 79*b* and 81*b* are connected together and to the base 82*b* of transistor 82. Collector 81*c* of transistor 81 is connected through 1K resistor 83 to the +6 v. point on the power supply. Collector 76c of transistor 76 is connected to the −18 v. point on the power supply. Collector 82*c* of transistor 82 is connected through 10K resistor 84 to the −12 v. point on the power supply, and collector 82*c* and collector 79*c* are connected together and to the lower point of resistor 84, and to the base 85*b* of transistor 85. Collector 85*c*** is connected to the −18 v. point on the power supply.

Collector **81*c* of transistor 81 is connected through 10K resistor 86 to emitter 82*e* of transistor 82, and the base 82*b* is connected to ground and to bases 79*b* and 81*b* of transistors 79 and 81. The subtractor output is taken from emitter 85*e* of transistor 85, connected through 3K resistor 86 to the +6 v. point on the power supply. Transistors 75 and 81 are type 2N585, transistors 79 and 82 are 2N404, transistor 76 is 2N1131, and transistor 85** is 2N526.

In operation the signals appearing on lines 75 and 76 are taken from the power detector 13 and 14 of FIG. 2. Transistors 75 and 79 amplify the input signal to transistor 75 coming from the power detector 13. The input to transistor 76 taken from power detector 14 is fed to transistor 76, and operates as an inverter stage. The signal from transistor 76 is further amplified in transistors 81 and 82. The outputs of transistors 82 and 79 are then summed across the summing resistor 84 and applied to the base of transistor 85. The output of transistor 85 is then taken across the emitter resistor 86 and fed to the separator 17 of FIG. 2.

Referring now to FIG. 5, showing the circuit diagram for the separator, amplifier, trigger, and summing circuits shown in block form in FIG. 2, the output from the subtractor shown in FIG. 4 is supplied in parallel to the input side of oppositely poled diodes 90 and 91, 90 being on the high side and 91 on the low. Resistor 92 is connected in series with the output side of diode 90, and resistance 93 is connected from the right-hand side of resistor 92 to ground. The junction of resistors 92 and 93 is connected to the slider **94*s* of potentiometer resistance 94, opposite ends of which are connected to −12 v. and +12 v. on the power supply. By adjustment of slider 94*s*, any voltage from −12 v. to +12 v. can be impressed on line 100, connected to ground through 0.15 mf. condenser 98**.

Similarly, the output side of diode 91 is connected through series resistor 95, and resistor 96 is connected from the right-hand side of resistor 95 to ground. The junction of resistors 95 and 96 is connected to slider **97*s* of potentiometer resistor 97, opposite ends of which are connected to −12 v. and +12 v. on the power supply. By adjustment of slider 97*s*, any voltage from −12 v. to +12 v. can be impressed on line 101, connected to ground through 1 mf. condenser 99**.

Line 100 is connected to base **102*b* of transistor 102, and line 101 to base 103*b* of transistor 103. Emitter 102*e* is connected to slider 104*s* of potentiometer resistor 104, one side of which is connected to −12 v. on the power supply, and the other side is connected to ground. Emitter 103*e* of transistor 103 is connected through resistor 105** to ground.

Collector **102*c* of transistor 102 is connected through 10K resistor 106 to ground, and to base 108*b* of transistor 108. Emitter 108*e* of transistor 108 is connected to emitter 110*e* of transistor 110 and through 100 ohms resistor 112 to ground. Collector 108*c* is connected through 5.1K resistor 114 to −12 v. on the power supply, and collector 110*c* is connected through 5.1K resistor 116 to the same −12 v. point. Collector 108*c* is also connected through 20K resistor 163 and 1.5K resistor 164 to ground. The junction of resistors 163 and 164 is connected to base 110*b* of transistor 110**.

On the low side, emitter **103*e* is connected to emitter 107*e* of transistor 107, the base 107*b* of which is connected to slider 109*s* of potentiometer resistor 109, one end of which is connected to −12 v. on the power supply, and the other end of which is grounded. Collector 107*c* is connected to ground through 10K resistor 111, and through resistor 113 to the base 115*b* of transistor 115. Emitter 115*e* is connected to ground through resistor 117, and collector 115*c* is connected through 20K resistor 119 and 1.5K resistor 120 to ground. The junction of resistors 119 and 120 is connected to the base 121*b* of transistor 121. Emitter 121*e* is connected to ground through resistor 117, and collector 121*c* is connected through 5.1K resistor 125 through resistor 123 to collector 115*c* and to collector 103*c***.

Collector **115*c* is connected through 27K resistor 127 to +12 v. through variable 25K resistor 129 and to base 131*b* of transistor 131. Emitter 131*e* is connected to ground through 1K resistor 133. Collector 131*c* is connected to output terminal, through 3K resistor 135 to −12 v. and to collector 137***c* of transistor 137. Emitter 137*e* is connected to ground through 1K resistor 139. Base 137*b* is connected to ground through variable resistor 141 and through 2K resistor 143 to collector 110*c* of transistor 110.

In this figure, again by way of example and not in limitation, diodes 90 and 91 are 1N270, transistor 102 is 2N306.

In operation the subtractor signals are applied to the opposite poled diodes 90 and 91 which are biased so that the high signals are passed by the diode 90 and the low signals by diode 91. The high side signals are passed by the diode 90, are applied to transistor 102 where they are amplified and then operate a trigger circuit made up of transistors 108 and 110. Similarly, the low side signals are passed by diode 91, amplified by amplifiers 103 and 107, and, in turn, operate the trigger circuit made up of transistors 115 and 121. The signal from the low side trigger circuit is applied to transistor amplifier 131. The output of transistor amplifier 131 and the output of the transistor 137 taken from the trigger circuit transistor 110 are combined across the summing resistor 135 and appear as an output at terminal 133*a*.

One class of applications of the principles and circuits above described is that of phoneme recognition; i.e., a circuit which can segment continuous speech into a sequence of component phonemes and recognize the individual phonemes by comparison of stored patterns of analog or digital form. An extension of these principles can lead to an automatic phoneme recognizer which will analyze an utterance into phonemes.

A circuit for accomplishing this is shown in FIG. 6, to which reference is had. This circuit will operate as a speech recognizer (indicating whether signals are speech or not speech), or as a language recognizer (indicating the particular language spoken, depending on what phonemes are stored in the memory).

In this figure, block 150 is a normalizer circuit, which operates to equalize the input power applied to the analyzer 151 and segmentor 152. The normalizer operates in a manner like the well known automatic gain control, frequently called automatic volume control, commonly used in radio and television equipment. The analyzer operates to separate the incoming speech into narrow frequency bands, ranging from 10 to 18 in number, and detects or rectifies the alternating current signals present in each band. The segmentor operates as already described, to establish the time boundaries for the beginning and end of each phoneme. The output of the analyzer in the various frequency bands for which filters are provided in the analyzer (in FIG. 6 only five are shown by way of example) is fed to digitizer 153, which converts these into a digitally coded representation of a phoneme. The digitizer accepts the various DC signals over the 10–18 wires from the analyzer. It is provided with a simple short-term memory of these signals so that all of the frequencies of a phoneme can be taken into consideration even though there are significant frequency changes within most phonemes. The resulting compressed form of the phoneme is then supplied in digital form to the phoneme comparator. As previously noted, the 39 phonemes in the English language can be represented in binary code with only six bits. The digitizer is typical of any well known analogue-to-digital encoding device.

The outputs of segmentor 152 and digitizer 153 are fed to phoneme comparator 155. The phoneme comparator can be any well known sort of small scale digital logic device, well known in computers, and may be a well known coincidence detector, which receives the coded output of digitizer 153 and compares it with the digitally coded phonemes stored in the memory 154. When coincidence occurs, the phoneme comparator generates an output signal which is fed to display 156, thereby indicating coincidence. Should no coincidence be detected, no signal is produced, and the display remains unactuated.

To operate as a speech recognizer, i.e., to indicate whether a stream of signals represent "speech," or "not speech," the various phonemes unique to the languages of interest are stored in the memory 154 in digital code, for instance, binary. After a stream of signals has been monitored, and no coincidence has been detected, a lamp or other indicator may be energized to show "not speech." If, on the other hand, phoneme coincidences are found, the signal indicating "speech" will be displayed. The time duration of the lamp signal display will be about equal to the segmentation interval, and the segmentor output supplied to the phoneme comparator indicates the beginning, duration, and end of each phoneme during which the comparator operates.

To operate as a particular language recognizer, only the phonemes unique to the particular language to be recognized would be stored in the memory. Coincidence between incoming signals and the phonemes unique to the particular language would energize a signal indicating the language recognized.

The equipment may also be used to indicate the absence of a particular language in a group of languages. For example, phonemes unique to English, French, German, and Russian may be stored in the memory, and a signal given for presence or absence of coincidence in any group. If coincidence is detected for English, French, and German, but not Russian, then the language is not Russian.

The principles may be summarized as follows:

The comparator accepts the digital form of the four or five chosen phonemes from the digitizer and (1) Compares this digital-representation with all of the phoneme representations in the memory and produces one of these outputs:

(a) The phoneme is unique to a particular language.

(b) The phoneme does not appear in a particular language.

(c) The phoneme does not appear in the memory.

(2) Compares the last three phonemes in a speech sequence with recognized sequences of phonemes and produces one of these outputs:

(a) The sequence is unique to a particular language.

(b) The sequence does not appear in a particular language.

(c) The sequence does not appear as a recognized sequence of interest.

The lamp panel display will indicate:

(1) When one of the four or five chosen phonemes is unique to a particular language.

(2) When the phoneme does not appear in a particular language.

(3) When the phoneme is not recorded in the memory.

(4) The one-out-of-four phoneme identification.

(5) When a sequence is unique to a particular language (memory requirements permitting).

The lamp signals will persist for about the segmentation interval.

The principles explained herein can be applied to speech compression (bandwidth, not time). In speech compression the objective is to extract the essential information-bearing elements of the phoneme and exclude most of the redundancy, in order to reduce speech channel bandwidth. High quality analog speech transmission systems require a channel of capacity greater than 50,000 bits/second. Much of this capacity is required for high fidelity, but not for intelligibility, so that the bandwidth required can be considerably reduced without substantially sacrificing intelligibility. Segmentation can permit large reductions in the data storage and processing requirements for either analog or digital speech compression.

Examples of applications of speech compression may be mentioned as follows:

Compression of speech into a narrow bandwidth, one way channel either:

(1) Using one of several carrier frequencies on a telephone voice channel such as used for voice frequency telegraph, or (2) Using a data link of capacity greater than 50 bits/second. The capacity required depends on number of voice signals to be transmitted—each voice signal requires at least 50 bits/second, as contrasted to best present system which require 2500 bits/second.

Features that should probably be contained in such a speech compressor are:

(1) A phoneme binary encoder (six bits per phoneme).

(2) a 20 bit shift register for three consecutive phonemes.

(3) A bank of 20 signal lamps operating from the shift register.

If the display 156 of FIG. 6 is replaced by any well known digital transmission system, FIG. 6 would then represent the transmission portion of the speech compression system.

The basic principles herein described may be applied to equipment for speaker recognition, wherein the object is to detect and "memorize" all of a particular speaker's speech idiosyncracies. The original speech analysis process used for this purpose is basically the same as in speech recognition; the principal difference being that for speaker recognition, more filters are needed and the coding must be expanded to convey more information. In both cases logic circuits correlate this coded form of the input speech with the speech patterns stored in digital form in the memory. The speaker recognizer output may take any of several forms, the simplest being just "Yes," meaning "Yes, this is Joe's voice."

The principles described herein are applicable to speech restatement, which may be defined as the process of producing speech by artificial means from a coded signal input. Such equipment would be useful in language interpretation. Input speech signals would be recognized as a particular language as already described, and the phonemes separated and analyzed. These may be used to key the speech-producing device to originate related sounds in some other selected language, thus acting as a translator without human intervention.

The method and apparatus herein involves inherent speech compression. Once the pattern has been identified, no further transmission is necessary until the pattern changes.

Sound is produced by the use of pulsed oscillators, with frequencies corresponding to the filter bank used in the recognizer. Pulsing, synchronized with the appearance of the coding, should act to assist in phasing of oscillators. These oscillators should automatically synchronize with the nearest harmonic of a local pitch generator.

Pitch may be approximated by the use of a sawtooth generator, synchronized by a pitch-sync signal transmitted as part of the pattern coding. The appearance of the pitch-sync signal may be used to start a gate generator, which permits passage of the output of the pitch general until a cutoff signal is produced, resulting from the cessation of phoneme pattern, etc. The appearance of a code with no pitch-sync signal may operate a gating and clipping amplifier to approximate the sounds that are not accompanied by pitch sound.

The output of the gating and clipping amplifier may be fed into a summing circuit and thence into a mixer which also would accept the outfrom the "pitch" sawtooth generator. The output from this has the characteristic pattern (in time) of vowel sounds, and, in the absence of pitch, the high harmonic content of such sounds. An amplifier completes this equipment. Variable gain in this amplifier will aid in achieving naturalness of expression.

Referring now to FIG. 7, this is a block diagram of a speech restatement circuit in accordance with the foregoing principles. In this figure, 160 represents a device which codes the 6 bit message words received from the data transmission link which can be substituted for the display 156 of FIG. 6. The 6 bit message codes representing one of the 39 possible phonemes are converted by circuitry condensed within the block, such as a shift register and a combinatorial switching network which converts serial to parallel information. For the example selected, the 6 bit message words are converted to 36 bit digital vocoder words. The 36 bit digital words control the filters in the Digital Vocoder Synthesizer. The Digital Vocoder Synthesizer converts the 36 bit digital vocoder word into a continuous analog signal 162. The analog signal then represents the speech output. If necessary, the output signals can be amplified and applied through a speaker or otherwise recorded as desired.

At this point, it should be mentioned that the signal appearing from the output of the speech compression system shown in FIG. 6 can be used directly, for example, to operate a phonetic typewriter or to directly provide instructions to a computer or in any other application requiring information in digital form.

In the foregoing, I have shown and described certain preferred embodiments of my invention, and the best mode presently known to me for practicing it, but it should be understood that modifications and changes may be made without departing from its spirit and scope, as will be clear to those skilled in the art.

What is claimed is:

1. A real time speech processing system for identifying phonemes, comprising, in combination, means for converting speech to be processed into electrical signals, means for separating said signals into at least two signal bands by frequency, means for integrating the power of each band over a period of time no greater than that of the shortest phoneme, and means for measuring the relative energy strength in said bands.

2. A real time speech processing system for identifying phonemes, comprising, in combination, means for converting speech to be processed into electrical signals, means for separating said signals into bands, one below 1,200 c.p.s., the other above 1,200 c.p.s., means for separately integrating the power of said signal bands over a time period less than that of the shortest phoneme, and means for subtracting one band integral from the other.

3. The combination claimed in claim 2, in which said last mentioned means subtracts the low frequency band integral from the high frequency band integral.

4. A real time speech processing system for identifying phonemes, comprising, in combination, means for converting speech to be processed into electrical signals, means for separating said signals into two bands, one below 1,200 c.p.s., the other above 1,200 c.p.s., means for separately integrating the power of said signal bands over a time period less than that of the shortest phoneme, and means for measuring the relative energy strength of said bands.

5. A real time speech segmentor, comprising, in combination, means for converting speech into electrical signals, means for separating said signals into at least two bands by frequency, means for separately integrating the power of said signal bands over a time period no greater than that of the shortest phoneme, means for determining the relative energy strength of said bands, means for separating negative from positive going pulses in the output of said relative energy determining means, a pair of trigger circuits keyed by said negative and positive going pulses respectively, and means for summing the outputs of said trigger circuits.

6. The combination claimed in claim 5 having a controllable gain amplifier in the high frequency channel between the frequency selector and the said integrating means.

7. The combination claimed in claim 5 having an amplifier interposed between said pulse separating means and each of said trigger circuits respectively.

8. The combination claimed in claim 5 having a controllable gain amplifier in the high frequency channel between the frequency selector and the said integrating means, and having an amplifier interposed between said pulse separating means and each of said trigger circuits respectively.

9. In a speech processor, in combination, means for producing a stream of electric signals to be processed, a normalizer receiving said signals, an analyzer and a segmentor fed in parallel from the output of said normalizer, a digitizer supplied from the output of said analyzer, a phoneme comparator, means for supplying the output of said digitizer and said segmentor respectively to said phoneme comparator, a memory, means for supplying information stored in said memory to said phoneme comparator, and an indicator operated by the output of said comparator.

10. The combination claimed in claim 9, in which said memory includes means for storing unique phonemes characteristic of speech in a plurality of languages.

11. The combination claimed in claim 9, in which said memory includes means for storing unique phonemes characteristic of speech, and in which said segmentor delivers to said comparator pulses corresponding in duration and actual time to phonemes in said signals.

12. The combination claimed in claim 9, in which said memory includes means for storing in binary code form unique phonemes characteristic of speech in a plurality of languages.

13. The combination claimed in claim 9, in which said memory includes means for storing in binary code form unique phonemes characteristic of speech, and in which said segmentor delivers to said comparator pulses corresponding in duration and actual time to phonemes in said signals.

References Cited

UNITED STATES PATENTS

| | | | |
|---|---|---|---|
| 3,234,332 | 2/1966 | Belar | 179—1 |
| 3,247,322 | 4/1966 | Savage et al. | 179—1 |
| 3,261,916 | 7/1966 | Bakis | 179—1 |

KATHLEEN H. CLAFFY, *Primary Examiner.*

R. MURRAY, *Assistant Examiner.*